Dec. 29, 1964      A. A. ZIROLI      3,163,123
ROAD RACE CAR STRUCTURE
Filed June 24, 1963
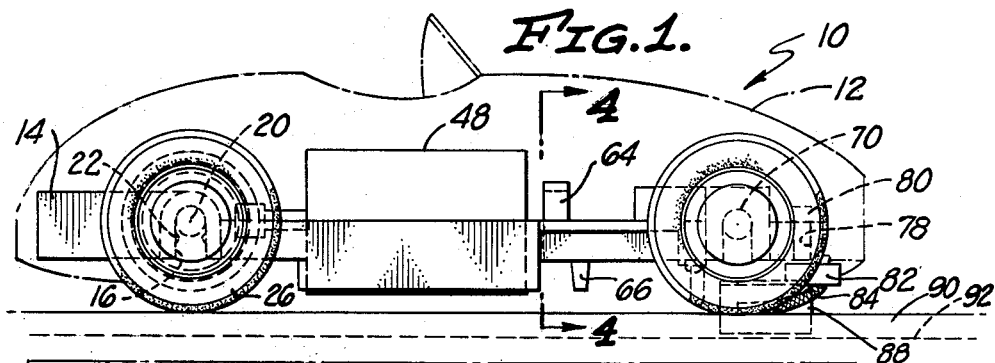
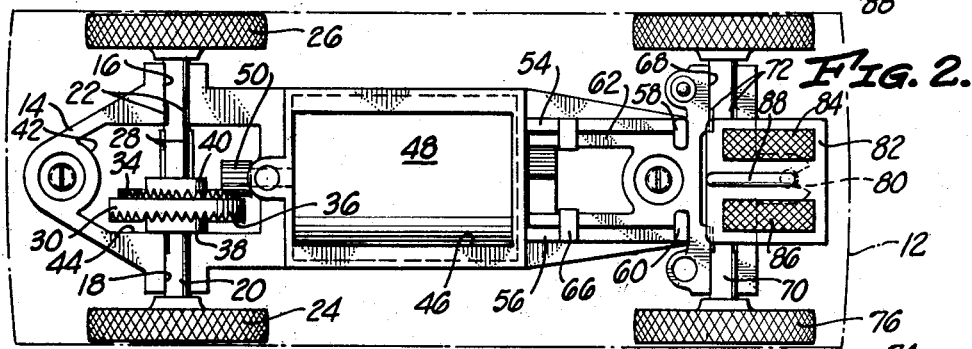
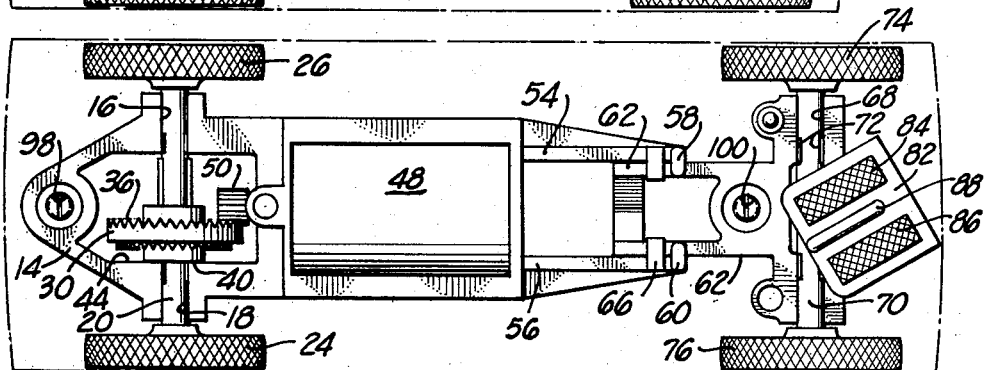
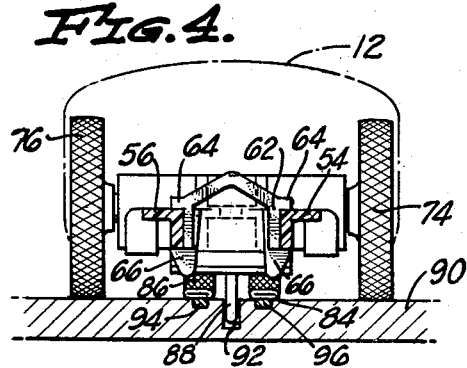
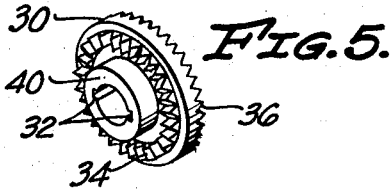
INVENTOR.
ALFRED A. ZIROLI
BY
EDWARD D. O'BRIAN
ATTORNEY

United States Patent Office 3,163,123
Patented Dec. 29, 1964

3,163,123
ROAD RACE CAR STRUCTURE
Alfred A. Ziroli, % Norman Dreyfuss, Eldon Industries, Inc., 1475 E. El Segundo Blvd., Hawthorne, Calif.
Filed June 24, 1963, Ser. No. 298,511
(Filed under Rule 47(b) and 35 U.S.C. 118)
20 Claims. (Cl. 104—60)

This invention relates to improved structure for road race cars. It is particularly suited to those cars which are arranged to be operated upon roadways having guiding means, and be powered by conductors in the roadway, although it is not limited to that particular environment.

In summary, this invention covers the design of chassis for road race car which is useable with several different bodies. The wheel base of the chassis is adjustable in accordance with the size of the particular body installed, and the drive train ratio is selectable in accordance with the body installed upon the chassis.

Prior road race cars were each especially designed for the particular model of race car represented by the equipment. Accordingly, the race cars with longer bodies required longer chassis, and each chassis had to be separately designed and built in accordance with the requirements of the body structure. Similarly, the drive mechanism of each model had to be particularly designed and built for the body configuration associated therewith in order to have a proper operable relationship to correspond to the body size and length represented by the model. This invention overcomes these objectionable features of the prior designs.

It is thus an object of this invention to provide a chassis structure which is adaptable to be used in a plurality of different size and configurations of body style.

It is another object of this invention to provide the chassis with a drive arrangement which is capable of several ratios so that they correspond to the requirements of size and weight of the body to which the chassis is applied, and so that the drive corresponds to the general prototype represented.

It is another object of this invention to provide a chassis capable of being installed in different sizes of race car bodies thus reducing engineering, manufacturing and inventory.

Other objects and advantages of this invention will become apparent upon inspection of the following specification and drawings in which:

FIGURE 1 is a side elevation of a road race car embodying this invention;

FIGURE 2 is a bottom view of the race car of FIGURE 1;

FIGURE 3 is a bottom view of the same chassis as represented in FIGURE 2 installed in a different race car body;

FIGURE 4 is a section taken along the line 4—4 of FIGURE 1; and

FIGURE 5 is a perspective view of the drive gear of this invention.

Referring now to the drawings, FIGURE 1 shows a road race car 10 having a body 12. Since the particular body is not part of this invention, it is shown in dashed lines. The road race car 10 has a chassis 14 which is provided with slots 16 and 18 which guide and retain rear axle 20. Retention of the rear axle 20 is accomplished by projections 22 which extend into the slots 16 and 18. The projections are of such size, and the material is of such resiliency, that the rear axle 20 can be snapped into the slots 16 and 18, past the projections 22, and securely retained thereby. Drive wheels 24 and 26 are mounted on the rear axle 20 to be driven thereby.

Rear axle 20 has keys 28 formed thereupon. Gear 30 is mounted upon axle 20 and its bore is provided with keyways 32, see FIGURE 5, so that gear 30 is irrotatably, but axially slidably mounted on rear axle 20.

Gear 30 is provided with gear teeth on both of its axial faces. Gear teeth 34 are located on a smaller radius than the gear teeth 36, on the opposite face of the gear 30, but both sets of gear teeth have the same tooth to tooth dimensions so that they may be driven by the same pinion. The gear 30 is provided with shoulders 38 and 40, and the chassis 14 is provided with an opening 42 having a wall 44. The dimensions of the gear 30 are such that when the shoulder 38 is in engagement with wall 44, the gear teeth 34 are in proper position to be engaged by the motor driven pinion. Similarly, when the shoulder 40 is in engagement with the wall 44, the gear teeth 36 are in position to be in engagement by the motor driven pinion.

The chassis 14 is provided with a motor mounting which includes a recess 46. A motor 48 mounted therein has a rearwardly directed drive shaft carrying pinion 50. The pinion 50 is in engagement with the appropriate gear face on gear 30. Pinion 50 has a face width sufficient to permit it to fully engage either teeth 34 or teeth 36 depending on the orientation of gear 30. Thus, when the motor 48 is energized, the pinion 50 rotates, and as seen in FIGURE 2, the teeth 34 are in engagement with pinion 50. Rotation of gear 30 by means of teeth 34 drives the axle 20 through keys 28 and drives the wheels 24 and 26.

As shown in FIGURE 3 the chassis 14 is installed in a larger car body 52. In view of the larger size and weight of this body 52, it is desired that the road race car have a greater gear reduction between the motor and the driven wheels, for proper performance. To accomplish this, the gear 30 is slid to the other end of axle 20, and the axle 20 is then reversed end for end and snapped into the chassis 14. Now the pinion 50 engages with the gear teeth 36 which are on a larger radius than the gear teeth 34 and accordingly a greater gear reduction is accomplished. The shoulder 40 engages against the wall 44 to maintain the proper gear engagement.

Referring again to FIGURE 2, the forward part of the chassis is provided with a pair of guides 54 and 56. These guides are also shown in FIGURE 4, where they are seen in section in the form of angles. The guides 54 and 56 carry stops 58 and 60 on their forward ends. A frame 62 is of such width as to fit between the guides 54 and 56 and pass adjacent to the stops 58 and 60. The frame 62 has upper fingers 64 mounted thereon. The upper fingers 64 are of such dimension and mounting that they pass over the top of the guides 54 and 56. The frame 62 also carries lower fingers 66 which engage beneath the guides 54 and 56. This permits the frame 62 to be slidable in a forward and rearward direction within the chassis 14. The fingers 64 and 66 on the frame 62 and the stops 58 and 60 on the chassis 14, restrain the frame 62 with respect to the chassis 14 so that it may only slide in the forward and rearward directions. Other than in that direction, the two members are substantially rigid with respect to each other. Furthermore, the stops 58 and 60, mounted on the chassis 14, are engaged by the fingers 66 so that the frame 62 can only move forward approximately as far as is shown in FIGURE 3.

The frame 62 contains slots 68, similar to the slots 16 and 18, in which is carried the front axle 70. The front axle 70 is retained in the slot 68 by means of projections 72 which extend into the slot 68. These projections are such size and the material is of such resiliency that the axle 70 may be snapped into place and retained within the slot 68. Secured to the axle 70 are wheels 74 and 76. A bore 78 in the frame 62, see FIGURE 1, carries a pin 80 which is mounted on brush holder 82. The brush holder 82 carries brushes 84 and 86 which are electrically connected to the motor 48, and the brush holder 82 also carries a guide vane 88.

The road race car is provided with a track 90, see FIGURE 4, which contains a guide slot 92 which accepts the guide vane 88, and the track 90 also carries electrical conductors 94 and 96 which are connected to an appropriate power supply and power control means and which are engaged by the brushes 86 and 84, respectively.

Chassis 14 is provided with an aperture 98 and frame 62 is provided with an aperture 100, which apertures are engaged by pins depending from the car body. These pins engage in the apertures 98 and 100 and secure the car body to the chassis and frame. Furthermore, these pins serve to establish the length between the axles 20 and 70, for the spacing of the pins engaging in apertures 98 and 100 establish how far the frame 62 is extended out of the chassis 14. By this means the same general chassis of the road race car can be used with the bodies of several lengths.

The instant invention thus provides a road race car chasis structure capable of being used in a plurality of different situations. The adjustability of the wheel base makes the underbody particularly suitable for use with a plurality of different body structures. When a larger longer race car body is installed on the chassis, the wheel base is extended to suit the longer body. Accordingly, the wheel base length is always appropriate for the particular body size and length and a plurality of chassis need not be provided for different road race cars. With a longer body, and accordingly heavier weight, it is desirable at the same time to provide a different drive train ratio, so that the motor, driving the larger road race car operates the car at an appropriate speed. The chassis provides selectable drive train ratios so that the correct ratio is available for the particular wheelbase selected. The drive train ratio is closely related to the overall length of the automobile, and particularly the wheel base, for the motor must be operated at different speeds to obtain optimum performance in different weight cars. This invention accordingly provides a chassis capable of adjustment in both wheel base length and drive train ratios so that the car chassis is at its optimum condition both in wheel base and drive train to suit the body which is placed thereon.

The applicant having described his invention in its preferred embodiment, it is apparent to those skilled in the art that numerous modifications and changes within the spirit of this invention are capable by the routine engineer. Accordingly, the following claims define the scope of this invention.

I claim:
1. A structure for use in a road race car, said structure including:
 a chassis, a rear axle mounted in said chassis;
 a frame mounted on said chassis, a front axle mounted in said frame, said frame being adjustable with respect to said chassis so that the dimension between said front axle and said rear axle is adjustable;
 a motor mounted on said chassis, said motor carrying a drive pinion;
 a gear irrotatably mounted on said rear axle to drive said rear axle, said gear engaging with said drive pinion, said gear having a first face of gear teeth and a second face of gear teeth, said first face and said second face of gear teeth having different numbers of teeth thereon, either one of said gear tooth faces being selectively engageable with said drive pinion to selectively establish different gear train ratios, so that the gear train ratio can be chosen in accordance with the dimension between said axles.

2. The structure of claim 1 wherein the dimension between said front axle and said rear axle is established by mounting means on said chassis and on said frame.

3. The structure of claim 1 wherein said frame is longitudinally adjustable with respect to said chassis by means of guides and fingers which restrain said frame to linear motion with respect to said chassis.

4. The structure of claim 2 wherein:
 slots are formed in said chassis and in said frame and projections are positioned to extend into said slots, said slots being so dimensioned as to accept said axles and said projections being so dimensioned and positioned within said slots as to permit said axles to be forced out of said slots past said projections, said rear axle being positioned in said slot in said chassis, and said front axle being positioned in said slot in said frame.

5. In a road race car having a chassis and a rear axle mounted in said chassis, and a front axle, the distance between said front axle and said rear axle being the wheel base of said road race car, the improvement comprising:
 a frame mounted upon said chassis, said frame being adjustable with respect to said chassis in the direction of the wheel base, said front axle being mounted on said frame;
 a gear mounted on said rear axle, said gear having a first face of gear teeth and a second face of gear teeth, said first and second faces of gear teeth having different numbers of teeth thereon, a motor mounted on said chassis, a drive pinion mounted on said motor in position to engage with gear teeth on said gear to provide a selectable drive train ratio so that said motor drives said pinion and said gear to drive said rear axle in a particular drive train ratio; and
 means to secure said chassis and said frame with a selected wheel base between said front axle and said rear axle, said drive train ratio being selected in accordance with the wheel base 6. The structure of claim 5 wherein said chassis and said frame have securing means whereby said wheel base can be fixed.

7. The structure of claim 5 wherein said frame and said chassis have guide means and interlocking fingers so that said frame is adjustable upon said chassis only in the direction of said wheel base.

8. The structure of claim 5 wherein guide means mounted upon said frame guides the direction of travel of said road race car.

9. The structure of claim 5 wherein said gear is slidably mounted in an axial direction along said rear axle and is irrevolvably mounted with respect to said rear axle.

10. The structure of claim 5 wherein inter-engaging means is provided upon said gear and upon said rear axle, said inter-engaging means comprising a keyway and a key positioned within said keyway so as to prevent rotation of said gear with respect to said rear axle but to permit movment of said gear along the length of said rear axle so that said drive train ratio may be easily selected by selectively placing one of said faces of gear teeth in engagement with said pinion.

11. A structure for use in a road race car, said structure including:
 a chassis having front and rear ends and parallel guides extending from the front end of said chassis toward the rear end of said chassis, a frame having front and rear ends and parallel guides, said guides on said frame extending from the rear end of said frame toward the front end of said frame, said frame being positioned with respect to said chassis so that the guides on said chassis and said frame fit against one another enabling said chassis to be moved with respect to said frame;
 cooperating means interconnecting said guides for holding said guides on said frame and said chassis in alignment with one another and enabling said chassis and said frame to be moved with respect to one another so as to vary the effective distance between the front end of said frame and the rear end of said chassis;

front axle mounting means directly mounted on said frame and extending transverse to said guides on said frame and said chassis, front axle means mounted in said front axle mounting means in nonsteerable relation to said frame, rear axle means directly mounted to said chassis and extending transverse to said guide means on said frame and said chassis;

means mounted on said chassis for driving said rear axle, said means being connected to said rear axle; and means interconnecting said chassis and said frame so as to secure said chassis and said frame with respect to one another so that the effective length of said chassis and said frame is capable of being varied.

12. The structure of claim 11 wherein:

said front axle mounting means comprises first and second front bearing means secured to said frame and a front axle positioned in said front bearing means and extending transverse to said guide means;

said rear axle means comprises first and second rear bearing means secured to said chassis and a rear axle positioned in said rear bearing means and extending transverse to said guide means.

13. The structure of claim 11 wherein a road race car body is mounted upon said chassis.

14. The structure of claim 12 wherein:

said means for driving said rear axle comprises:

motor means mounted on said chassis, a pinion on said motor means and being adapted to be driven by said motor means; and a gear irrotatably mounted on said rear axle, said gear being in engagement with said pinion 15. The structure of claim 12 wherein:

said bearing means on said chassis and on said frame comprise slots in said chassis and in said frame and projections extending into said slots, said slots being of such dimension as to be adapted to receive an axle and said projections being of such dimension as to be adapted to retain said axles within said slots.

16. A chassis for a road race car, an axle rotatably mounted in said chassis, said axle being adapted to be powered, a frame mounted upon said chassis, said frame being adjustable in a first direction with respect to said chassis, axle mounting means non-detachably secured to said frame, a second axle rotatably mounted in said axle mounting means on said frame in nonsteerable relationship with respect to said frame, the distance between said first and second axles being the wheelbase of said chassis, the position of said frame with respect to said chassis in said first direction establishing the wheel base of said chassis.

17. The structure of claim 16 wherein said frame is locked with respect to said chassis along said direction so that said wheel base is fixed.

18. A drive train for road race car, said drive train including:

a driving pinion and a driven axle in said drive train, said driven axle having an axis establishing an axial direction;

a gear irrotatably mounted on said axle, said gear having first and second axial faces facing in opposite directions along said axis, said gear having first and second sets of teeth, said first set of teeth being positioned on said first face and said second set of teeth being positioned on said second face, said second set of teeth having a different number of teeth therein than said first set of teeth, said first set of teeth being in engagement with said pinion, said axle and said gear being selectively positionable so that said second set of teeth is in engagement with said pinion.

19. The structure of claim 26 wherein:

said gear carries a first shoulder on said first axial face and a second shoulder on said second axial face, said first shoulder being provided to maintain said second set of gear teeth in engagement with said pinion and defining an axial distance between said first shoulder and said second set of gear teeth, said second shoulder being axially spaced from said first set of gear teeth by substantially the same axial distance so that when said first set of gear teeth is in engagement with said pinion said second shoulder maintains said engagement.

20. The structure of claim 18 wherein the tooth to tooth distance between gear teeth is substantially the same as in the first and second sets of gear teeth.

References Cited by the Examiner
UNITED STATES PATENTS

| | | | |
|---|---|---|---|
| 1,240,069 | 9/17 | McCallister | 74—412 X |
| 1,286,616 | 12/18 | Hatfield | 74—412 |
| 1,471,549 | 10/23 | Clement | 296—26 |
| 1,606,691 | 11/26 | Boyer | 104—60 |
| 1,959,172 | 5/34 | McIlrath | 105—155 |
| 2,112,072 | 3/38 | Cullen | 104—60 |
| 2,493,236 | 1/50 | Dunstan | 296—26 |
| 2,749,764 | 6/56 | Chou | 74—416 X |

LEO QUACKENBUSH, *Primary Examiner.*

UNITED STATES PATENT OFFICE
CERTIFICATE OF CORRECTION

Patent No. 3,163,123            December 29, 1964

Alfred A. Ziroli

It is hereby certified that error appears in the above numbered patent requiring correction and that the said Letters Patent should read as corrected below.

Column 6, line 24, for the claim reference numeral "26" read -- 18 --.

Signed and sealed this 22nd day of June 1965.

(SEAL)
Attest:

ERNEST W. SWIDER
Attesting Officer

EDWARD J. BRENNER
Commissioner of Patents